(12) United States Patent
Kito et al.

(10) Patent No.: US 11,326,031 B2
(45) Date of Patent: May 10, 2022

(54) THERMOPLASTIC RESIN SHEET, LAMINATED SHEET, AND MOLDED OBJECT

(71) Applicant: TOYOTA BOSHOKU KABUSHIKI KAISHA, Aichi (JP)

(72) Inventors: Masayuki Kito, Okazaki (JP); Kosuke Geho, Toyota (JP); Mitsutaka Sako, Nagakute (JP); Goro Takahashi, Owariasahi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 258 days.

(21) Appl. No.: 16/491,885

(22) PCT Filed: Mar. 9, 2018

(86) PCT No.: PCT/JP2018/009342
§ 371 (c)(1),
(2) Date: Sep. 6, 2019

(87) PCT Pub. No.: WO2018/168720
PCT Pub. Date: Sep. 20, 2018

(65) Prior Publication Data
US 2020/0032018 A1    Jan. 30, 2020

(30) Foreign Application Priority Data

Mar. 16, 2017   (JP) .............................. JP2017-051870

(51) Int. Cl.
*C08J 5/18* (2006.01)
*C08J 5/04* (2006.01)

(52) U.S. Cl.
CPC ................ *C08J 5/18* (2013.01); *C08J 5/043* (2013.01); *C08J 5/046* (2013.01); *C08J 2323/06* (2013.01); *C08J 2323/12* (2013.01); *C08J 2325/06* (2013.01); *C08J 2377/06* (2013.01)

(58) Field of Classification Search
CPC . C08J 5/18; C08J 5/043; C08J 2325/06; C08J 2323/06; C08J 2377/06; C08J 2323/12
USPC ...................................................... 428/515
See application file for complete search history.

(56) References Cited

U.S. PATENT DOCUMENTS

| | | | | |
|---|---|---|---|---|
| 6,117,561 | A * | 9/2000 | Jacquemet | C08L 23/06 428/475.5 |
| 2006/0280889 | A1* | 12/2006 | Powell | F16L 11/085 428/36.91 |
| 2013/0056123 | A1 | 3/2013 | Tomoi et al. | |
| 2013/0344270 | A1 | 12/2013 | Otaki et al. | |
| 2014/0364569 | A1* | 12/2014 | Kito | C08L 23/02 525/183 |
| 2014/0371394 | A1 | 12/2014 | Kito et al. | |
| 2015/0337186 | A1 | 11/2015 | Marchese et al. | |
| 2017/0029610 | A1 | 2/2017 | Kito et al. | |

FOREIGN PATENT DOCUMENTS

| | | | |
|---|---|---|---|
| CA | 2102054 | 2/2000 | |
| CA | 2102054 C | * 2/2000 | ......... B29C 63/0017 |
| EP | 2796496 A1 | 10/2014 | |
| EP | 2796497 A1 | 10/2014 | |
| EP | 3385321 A1 | 10/2018 | |
| EP | 3438180 A1 | 2/2019 | |
| EP | 3492523 A1 | 6/2019 | |
| JP | 6-122780 | 5/1994 | |
| JP | 7-299859 | 11/1995 | |
| JP | 2011-074214 | 4/2011 | |
| JP | 2011-246626 | 12/2011 | |
| JP | 2013-147645 | 8/2013 | |
| JP | 2013-147646 | 8/2013 | |
| JP | 2013-147647 | 8/2013 | |
| JP | 2013-147648 | 8/2013 | |
| JP | 2016-511782 | 4/2016 | |
| JP | 2016-222932 A | 12/2016 | |
| KR | 1996-0005304 | 4/1996 | |
| WO | 91/02027 | 2/1991 | |
| WO | 2012-121295 | 9/2012 | |

(Continued)

OTHER PUBLICATIONS

Office Action in corresponding Chinese Application No. 201880014360.3, dated Aug. 26, 2020 (w/English machine translation).
Office Action in corresponding Brazilian Application No. BR112019015862-6, dated Sep. 3, 2020 (w/English machine translation).
Trial Decision on Appeal against Decision to Reject Application issued with respect to Korean Application 20197026673, dated Jan. 5, 2021 (with English Machine translation).
Extended European Search Report issued with respect to Application No. 18768420.4, dated Nov. 23, 2020.
Chinese Office Action, Chinese Patent Office, Application No. 201880014360.3, dated Mar. 4, 2020, with English translation thereof.
Korean Office Action, Korean Patent Office, Application No. 10-2019-7026673, dated Mar. 5, 2020, with English translation thereof.

(Continued)

*Primary Examiner* — Hui H Chin
(74) *Attorney, Agent, or Firm* — Greenblum & Bernstein, P.L.C.

(57) ABSTRACT

Disclosed herein are a thermoplastic resin sheet having excellent mechanical strength and excellent conformability during molding, a laminated sheet using such a thermoplastic resin sheet, and a molded body. The thermoplastic resin sheet includes a thermoplastic resin containing a polyolefin resin, a polyamide resin, and a compatibilizer, wherein the compatibilizer is a modified elastomer having a reactive group that reacts with the polyamide resin. The laminated sheet includes a base layer containing a polyolefin resin and the thermoplastic resin sheet bonded to one surface of the base layer. The molded body includes a base body containing a polyolefin resin and the thermoplastic resin sheet or the laminated sheet bonded to one surface of the base body.

9 Claims, 4 Drawing Sheets

(56) References Cited

FOREIGN PATENT DOCUMENTS

WO    2013/094764    6/2013

OTHER PUBLICATIONS

Office Action issued in corresponding Brazilian App. No. BR112019015862-6, dated Jan. 11, 2020, with English translation.
International Search Report issued in International Patent Application No. PCT/JP2018/009342, dated May 29, 2018, along with English translation.
Korean Office Action, Korean Patent Office, Application No. 10-2019-7026673, dated Nov. 28, 2019, with English machine translation.
Indian Office Action, Indian Patent Office, Application No. 201917033509, dated Jun. 10, 2020.
Korean Office Action, Korean Patent Office, Application No. 10-2019-7026673, dated Jun. 11, 2020, English translation.
Office Action (Hearing Notice) issued in corresponding Indian Application No. 201917033509, dated Aug. 26, 2021.

* cited by examiner

THERMOPLASTIC RESIN SHEET, LAMINATED SHEET, AND MOLDED OBJECT

TECHNICAL FIELD

The present invention relates to a thermoplastic resin sheet, a laminated sheet, and a molded body. More specifically, the present invention relates to a thermoplastic resin sheet containing a polyolefin resin and a polyamide resin, and a laminated sheet and a molded body which use the thermoplastic resin sheet.

BACKGROUND ART

Studies have heretofore been made to obtain a resin mixture of different resins, which is capable of exhibiting properties of the resins by itself or capable of exhibiting properties superior to those of the respective resins. For example, the following Patent Literatures 1 to 4 disclose techniques to improve the properties of a resin mixture obtained using a polyolefin resin and a polyamide resin. Further, the following Patent Literature 5 discloses a thermoplastic resin sheet containing a polyolefin resin and a polyamide resin.

CITATIONS LIST

Patent Literatures

Patent Literature 1: JP 2013-147645 A
Patent Literature 2: JP 2013-147646 A
Patent Literature 3: JP 2013-147647 A
Patent Literature 4: JP 2013-147648 A
Patent Literature 5: JP 2011-074214 A

SUMMARY OF INVENTION

Technical Problems

Patent Literature 1 discloses that a modified elastomer can be used as a compatibilizer in a resin mixture containing a polyamide resin and a polyolefin resin.

Patent Literature 2 discloses that a plant-derived polyamide resin can be used in a resin mixture containing a polyamide resin and a polyolefin resin.

Patent Literature 3 discloses that a resin mixture containing a polyamide resin and a polyolefin resin can have a phase structure having a continuous phase, a dispersed phase, and a fine dispersed phase.

Patent Literature 4 discloses that a resin mixture having excellent impact resistance can be obtained by melt-mixing a polyamide resin and a compatibilizer to obtain a resin mixture and then further melt-mixing the resin mixture and a polyolefin resin.

In Patent Literatures 1 to 4, however, there is no description about the use of these resin mixtures as sheets.

Patent Literature 5 discloses a thermoplastic resin film that contains a polyamide resin and a polyolefin resin and has a sea-island phase structure. However there is no description about a film having excellent mechanical strength, and further there is no description about conformability during molding.

In light of the above circumstances, it is an object of the present invention to provide a thermoplastic resin sheet having excellent mechanical strength, a laminated sheet using such a thermoplastic resin sheet, and a molded body using such a thermoplastic resin sheet. More particularly, it is an object of the present invention to provide a thermoplastic resin sheet excellent not only in mechanical strength but also in conformability during molding, a laminated sheet using such a thermoplastic resin sheet, and a molded body using such a thermoplastic resin sheet.

Solutions to Problems

In order to achieve the above object, the present invention provides the following.

A thermoplastic resin sheet according to claim 1 includes a thermoplastic resin containing a polyolefin resin, a polyamide resin, and a compatibilizer; wherein the compatibilizer is a modified elastomer having a reactive group that reacts with the polyamide resin.

A thermoplastic resin sheet according to claim 2 is the thermoplastic resin sheet according to claim 1, which has a continuous phase (A) containing the polyolefin resin, and a dispersed phase (B) dispersed in the continuous phase (A) and containing the polyamide resin and the modified elastomer.

A thermoplastic resin sheet according to claim 3 is the thermoplastic resin sheet according to claim 2, wherein the dispersed phase (B) has a continuous phase ($B_1$) containing the polyamide resin, and a fine dispersed phase ($B_2$) dispersed in the continuous phase ($B_1$) and containing the modified elastomer:

A thermoplastic resin sheet according to claim 4 is the thermoplastic resin sheet according to any one of claims 1 to 3, which is a melt-kneaded product of a melt-kneaded product of the polyamide resin and the modified elastomer and the polyolefin resin.

A thermoplastic resin sheet according to claim 5 is the thermoplastic resin sheet according to any one of claims 1 to 4, wherein the polyamide resin has a structure in which a hydrocarbon group between adjacent amide bonds in a main chain has a linear chain of 6 or more carbon atoms.

A thermoplastic resin sheet according to claim 6 is the thermoplastic resin sheet according to any one of claims 1 to 5, wherein the modified elastomer is an olefin-basal thermoplastic elastomer having, as a skeleton, a copolymer of ethylene or propylene and an α-olefin having 3 to 8 carbon atoms or a styrene-based thermoplastic elastomer having a styrene skeleton.

A thermoplastic resin sheet according to claim 7 is the thermoplastic resin sheet according to any one of claims 1 to 6, wherein when its elongation at break at a temperature of 140° C. is defined as $S_{140}$(%) and its elongation at break at a temperature of 120° C. is defined as $S_{120}$(%), $S_{140}$ is 1.2 times or more $S_{120}$.

A laminated sheet according to claim 8 includes a base layer containing a polyolefin resin, and the thermoplastic resin sheet according to any one of claims 1 to 7 bonded to one surface of the base layer.

A molded body according to claim 9 includes a base body containing a polyolefin resin, and the thermoplastic resin sheet according to any one of claims 1 to 7 or the laminated sheet according to claim 8, the thermoplastic resin sheet or the laminated sheet being bonded to one surface of the base body.

A molded body according to claim 10 is the molded body according to claim 9, wherein the base body contains reinforcing fibers and a hinder binding the reinforcing fibers together; and the binder is the polyolefin resin.

Advantageous Effects of Invention

The thermoplastic resin sheet according to the present invention has excellent mechanical strength. Further, the thermoplastic resin sheet according to the present invention can be bonded to the surface of a molded body with excellent conformability, and can impart its own mechanical strength to the molded body.

The laminated sheet according to the present invention has the thermoplastic resin sheet bonded to the surface of the base layer with excellent conformability, and the mechanical strength of the thermoplastic resin sheet is imparted to the laminated sheet. Further, the laminated sheet according to the present invention can be bonded to the surface of a base body when the base body is molded. In this case, the laminated sheet can be bonded to the surface of the resulting molded body with excellent conformability, and can impart the mechanical strength of the thermoplastic resin sheet to the molded body.

The molded body according to the present invention has the thermoplastic resin sheet bonded to the surface of the base body with excellent conformability; and the mechanical strength of the thermoplastic resin sheet is imparted to the molded body. Therefore, the molded body can exhibit, as a whole, mechanical strength higher than that exhibited only by the base body.

BRIEF DESCRIPTION OF DRAWINGS

The present invention is further described in the following detailed description with reference to non-limiting examples of exemplary embodiments of the present invention and the noted drawings, in which the same reference numerals represent the same parts throughout several views of the drawings.

DESCRIPTION OF EMBODIMENTS

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, the description taken with the drawings making apparent to those skilled in the art how the several forms of the present invention may be embodied in practice.

[1] Thermoplastic Resin Sheet

A thermoplastic resin sheet (1) according to the present invention includes a thermoplastic resin containing a polyolefin resin, a polyamides resin, and a compatibilizer wherein the compatibilizer is a modified elastomer having a reactive group that reacts with the polyamide resin.

(1) Polyolefin Resin

The polyolefin resin constituting the thermoplastic resin sheet according to the present invention may be an olefin homopolymer acid/or an olefin copolymer.

The olefin is not particularly limited, and examples thereof include ethylene, propylene, and an α-olefin having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin (another olefin does not include ethylene). Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin (another olefin does not include propylene). Examples of the latter include a propylene-ethylene copolymer and a propylene-1-butene copolymer (the content of a propylene-derived structural unit is 50% or more of the total structural units).

The copolymer of propylene and another olefin may be either a random copolymer or a block copolymer. Among them, a block copolymer is preferred from the viewpoint of obtaining a thermoplastic resin sheet laving a larger value of $S_{140}/S_{120}$ that will be described later. Particularly, a propylene-ethylene block copolymer having ethylene as another olefin is preferred. Such a propylene-ethylene block copolymer is also called, for example, an impact copolymer, a polypropylene impact copolymer, a heterophasic polypropylene, or a heterophasic block polypropylene.

The weight-average molecular weight (based on polystyrene standards) of the polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the polyolefin resin is a polyolefin that has no affinity for the polyamide resin that will be described later, and that has no reactive group capable of reacting with the polyamide resin, either. In this point, the polyolefin resin is different from an olefin-based component as the modified elastomer that will be describe later.

(2) Polyamide Resin

The polyamide resin constituting the thermoplastic resin sheet according to the present invention is a polymer obtained by polymerizing a plurality of monomers via amide bonds (—NH—CO—).

Examples of a monomer constituting the polyamide resin include amino acids such as 6-aminocaproic acid, 11-aminoundecanoic acid, 12-aminododecanoic acid, and para-aminomethyl benzoic acid, and lactams such as ε-caprolactam, undecane lactam, and ω-lauryl lactam. These olefins may be used singly or in combination of two or more of them.

Further, the polyamide resin can be obtained also by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminopropane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis-(4-aminocyclohexyl)methane; and aromatic diamines such as xylylene diamines (e.g., p-phenylenediamine and m-phenylenediamine). These olefins may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These olefins may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-mentioned various polyamide resins, one may be used which has a structure in which a hydrocarbon group between adjacent amide bonds in a main chain has a linear chain of 6 or more carbon atoms (usually 16 or less carbon atoms) (in the present invention, simply referred to as a "long chain structure"). That is, a polyamide resin laving a long chain structure may be used. When a polyamide resin having a long chain structure is used, the content of the long chain structure is preferably 50% or more and may be 100% of all the structural units of the polyamide resin. Specific examples of the polyamide resin having a long chain structure include polyamide 11, polyamide 610, polyamide 612, polyamide 614, polyamide 12, polyamide 6T, polyamide 6I, polyamide 9T, polyamide 1010, polyamide 1012, polyamide 10T, and polyamide 9T/2M-8T. These polyamides may be used singly or in combination of two or more of them. The use of such a polyamide resin having a long chain structure makes it possible to provide a thermoplastic resin sheet having more excellent impact resistance.

Furthermore, in the present invention, among the above-mentioned various polyamide resins, one derived from a plant may be used. A plant-derived polyamide resin is desirable from the viewpoint of environmental protection (particularly from the viewpoint of carbon neutral) because it uses a monomer derived from a plant-derived component such as a vegetable oil.

Examples of the plant-derived polyamide resin include polyamide 11 (hereinafter also simply referral to as "PA11"), polyamide 610 (hereinafter also simply referral to as "PA610"), polyamide 612 (hereinafter also simply referred to as "PA612"), polyamide 614 (hereinafter also simply refereed to as "PA614"), polyamide 1010 (hereinafter also simply referred as "PA1010"), polyamide 1012 (thereinafter also simply referred to as "PA1012"), and polyamide 10T (hereinafter also simply referred to as "PA10T"). These olefins may be used singly or in combination of two or more of them.

Among the above plant-derived polyamide resins, PA11 is superior to the other plant-derived polyamide resins in terms of low water absorbability, low specific gravity, and high biomass degree. Polyamide 610 is inferior to PA11 in water absorption rate, chemical resistance, and impact strength, but is excellent in heat resistance (melting point) and strength. Further, polyamide 610 is superior to polyamide 6 or polyamide 66 in terms of low water absorbability and size stability, and therefore can be used as an alternative to polyamide 6 or polyamide 66. Polyamide 1010 is superior to PA11 in heat resistance and strength. Further, the biomass degree of polyamide 1010 is comparable to that of PA11, and therefore polyamide 1010 can be used for parts required to have higher durability. Polyamide 10T has an aromatic ring in its molecular skeleton, and therefore has a higher melting point and higher strength than polyamide 1010. Therefore, the use of polyamide 10T makes it possible to use the thermoplastic resin sheet in a harsher environment.

The weight-average molecular weight (based on polystyrene standards) of the polyamide resin measured by gel permeation chromatography (GPC) is not particularly limited, and may be, for example, 5,000 or more but 100,000 or less, but is preferably 7,500 or more but 50,000 or less, more preferably 10,000 or more but 50,000 or less.

(3) Modified Elastomer

The modified elastomer constituting the thermoplastic resin sheet according to the present invention is an elastomer having a reactive group that reacts with the polyamide resin. This modified elastomer is preferably a component having an affinity for the polyolefin resin. That is, the modified elastomer is preferably a component having compatibilizing effect on the polyamide resin and the polyolefin resin. In other words, the modified elastomer is preferably a compatibilizer for the polyamide resin and the polyolefin resin.

Examples of the reactive group include an acid anhydride group (—CO—O—OC), a carboxyl group (—COOH), an epoxy group {—$C_2O$ (a three-membered ring structure composed of two carbon atoms and one oxygen atom)}, an oxazoline group (—$C_3H_4NO$), and an isocyanate group (—NCO). These olefins may be used singly or in combination of two or more of them.

The amount of modification of the modified elastomer is not limited, and the modified elastomer only needs to have one or more reactive groups per molecule. Further, the modified elastomer preferably has 1 or more but 50 or less reactive groups, more preferably 3 or more but 30 or less reactive groups, particularly preferably 5 or more but 20 or less reactive groups per molecule.

Examples of the modified elastomer include: a polymer using any monomer capable of introducing a reactive group (a modified elastomer obtained by polymerization using monomers capable of introducing a reactive group); an oxidative degradation product of any polymer (a modified elastomer having a reactive group formed by oxidative degradation); and a graft polymer obtained by graft polymerization of an organic acid on any polymer (a modified elastomer having a reactive group introduced by graft polymerization of an organic acid). These olefins may be used singly or in combination of two or more of them. These olefins may be used singly or in combination of two or more of them.

Examples of the monomer capable of introducing a reactive group include a monomer having a polymerizable unsaturated bond and an acid anhydride group, a monomer having a polymerizable unsaturated bond and a carboxyl group, and a monomer having a polymerizable unsaturated bond and an epoxy group.

Specific examples of the monomer capable of introducing a reactive group include: acid anhydrides arch as maleic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, and methacrylic acid. These compounds may be used singly or in combination of two or more of them. Among these compounds, acid anhydrides are preferred, maleic anhydride and itaconic anhydride are more preferred, and maleic anhydride is particularly preferred.

The type of resin constituting the skeleton of the modified elastomer (hereinafter referred to as a "skeletal resin") is not particularly limited, and various thermoplastic resins may be used. As the skeletal resin, one or two or more of the above-mentioned various polyolefin resins may be used. Other examples of the skeletal resin include an olefin-based thermoplastic elastomer and a styrene-based thermoplastic elastomer. These olefins may be used singly or in combination of two or more of them.

The olefin-based thermoplastic elastomer may be a copolymer of two or more olefins.

One or two or more of the olefins may be one or two or more of the various olefins mentioned above as examples of an olefin constituting the polyolefin resin. The olefin-based thermoplastic elastomer is particularly preferably a copolymer of ethylene and an α-olefin having 3 to 8 carbon atoms or a copolymer of propylene and an α-olefin having 4 to 8 carbon atoms.

Specific examples of the copolymer of ethylene find an α-olefin having 3 to 8 carbon atoms include an ethylene/propylene copolymer (EPR), an ethylene/1-butene copolymer (EBR), an ethylene/1-pentene copolymer, and an ethylene/1-octene copolymer (EOR).

Examples of the copolymer of propylene and an α-olefin having 4 to 8 carbon atoms include a propylene-1-butene copolymer (PBR), a propylene-1-pentene copolymer, and a propylene-1-octene copolymer (POR). These olefins may be used singly or in combination of two or more of them.

Examples of the styrene-based thermoplastic elastomer include a block copolymer of a styrene-based compound and a conjugated diene compound and a hydrogenated product thereof.

Examples of the styrene-based compound include styrene, alkyl styrenes such as α-methyl styrene, p-methylstyrene, and p-t-butyl styrene, p-methoxy styrene, and vinyl naphthalene. These olefins may be used singly or in combination of two or more of than.

Examples of the conjugated diene compound include butadiene, isoprene, piperylene, methyl pentadiene, phenyl butadiene, 3,4-dimethyl-1,3-hexadiene, and 4,5-diethyl-1,3-octadiene. These olefins may be used singly or in combination of two or more of them.

Specific examples of the styrene-based thermoplastic elastomer include a styrene-butadiene-styrene (SBS) copolymer; a styrene-isoprene-styrene (SIS) copolymer, a styrene-ethylene/butylene-styrene (SEBS) copolymer, and a styrene-ethylene/propylene-styrene (SEPS) copolymer. These olefins may be used singly or in combination of two or more of them. Among them, SEBS is preferred.

The weight-average molecular weight (based on polystyrene standards) of the modified elastomer measured by gel permeation chromatography (GPC) is not particularly limited, and may be, for example, 10,000 or more but 500,000 or less, but is preferably 35,000 or more but 500,000 or less, more preferably 35,000 or more but 300,000 or less.

(4) Oliver Components

The thermoplastic resin sheet according in the present invention may contain other components in addition to the polyolefin resin, the polyamide resin, and the modified elastomer. Examples of the other components include a filler (reinforcing filler), a nucleating agent an antioxidant, a thermal stabilizer, a weatherproofer, a light stabilizer, a plasticizer, an ultraviolet absorber, an antistatic agent, a flame retardant, a flame retardant aid, a slip agent, an antiblocking agent, an antifog agent, a lubricant, an antimicrobial agent, a colorant (pigment, dye), a disperser, a copper inhibitor, a neutralizer, an anti-foam agent, a weld strength improver, a natural oil, a synthetic oil, and a wax. These olefins may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These olefins may be used singly or in combination of two or more of them.

Examples of the filler include: glass components (e.g., glass fibers, glass beads, and glass flakes); silica; inorganic fibers (glass fibers, alumina fibers, and carbon fibers), graphite, silicate compounds (e.g., calcium silicate, aluminum silicate, montmorillonite, kaolin, talc, and clay), metal oxides (e.g., iron oxide, titanium oxide, zinc oxide, antimony oxide, and alumina), carbonates and sulfates of metals such as lithium, calcium, magnesium, and zinc, metals (e.g., aluminum, iron, silver, and copper), hydroxides (e.g., aluminum hydroxide and magnesium hydroxide), sulfides (e.g., barium sulfate), carbides (e.g., wood charcoal and bamboo charcoal), titanades (potassium titanate and barium titanate), organic fibers (e.g., aromatic polyester-filters, aromatic polyamide fibers, fluororesin fibers, polyimide fibers, and vegetable fibers), and celluloses (e.g., cellulose microfibrils and cellulose acetate). These olefins may be used singly or in combination of two or more of them. They can be used also as a nucleating agent.

(5) Phase Structure

The phase structure of the thermoplastic resin sheet according to the present invention is not limited, but the thermoplastic resin sheet according to the present invention can have the following phase structure (1), (2), or (3).

Phase structure (1): A phase structure having a continuous phase (A) containing a polyolefin resin and a dispersed phase (B) dispersed in the continuous phase (A) and containing a polyamide resin and a modified elastomer (see FIG. 1) It is to be noted that the phase structure (1) does not coexist with another phase structure having a continuous phase containing a polyamide resin and a dispersed phase dispersed in the continuous phase.

Phase structure (2): A phase structure having a continuous phase containing a polyamide resin and a dispersed phase dispersed in the continuous phase and containing a polyolefin resin It is to be noted that the phase structure (2) does not coexist with another phase structure having a continuous phase containing a polyolefin resin and a dispersed phase dispersed in the continuous phase.

Figure 2:
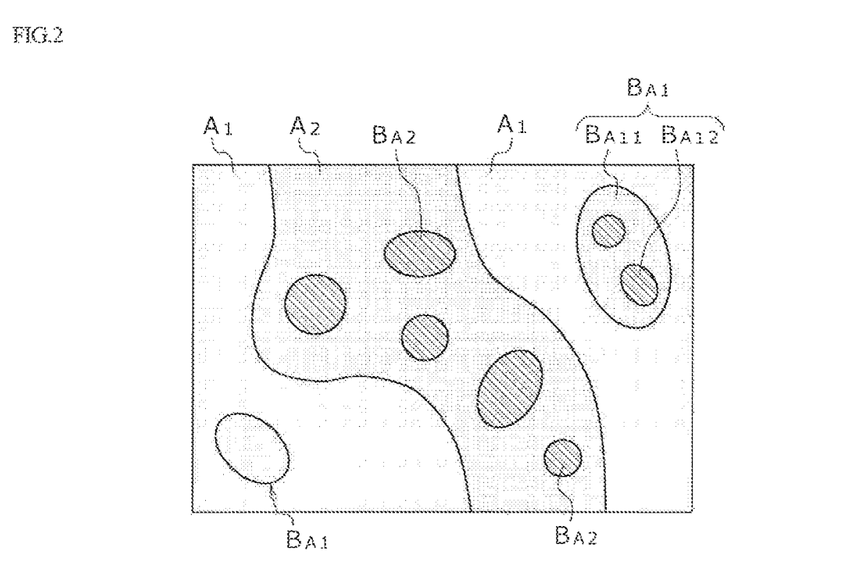
FIG. 2 is an illustration for explaining a phase structure (3) of a thermoplastic resin composition constituting a thermoplastic resin sheet according to the present invention.

Phase Structure (3): A phase structure having a continuous phase ($A_1$) containing a polyolefin resin, a dispersed phase ($B_{A1}$) dispersed in the continuous phase ($A_1$) and containing a polyamide resin and a modified elastomer, a continuous phase ($A_2$) containing a polyamide resin, and a dispersed phase ($B_{A2}$) dispersed in the continuous phase ($A_2$) and containing a modified elastomer (see FIG. 2)

Among these phase structures, the phase structure (1) or the phase structure (3) is preferred, and the phase structure (1) is more preferred.

Figure 1:
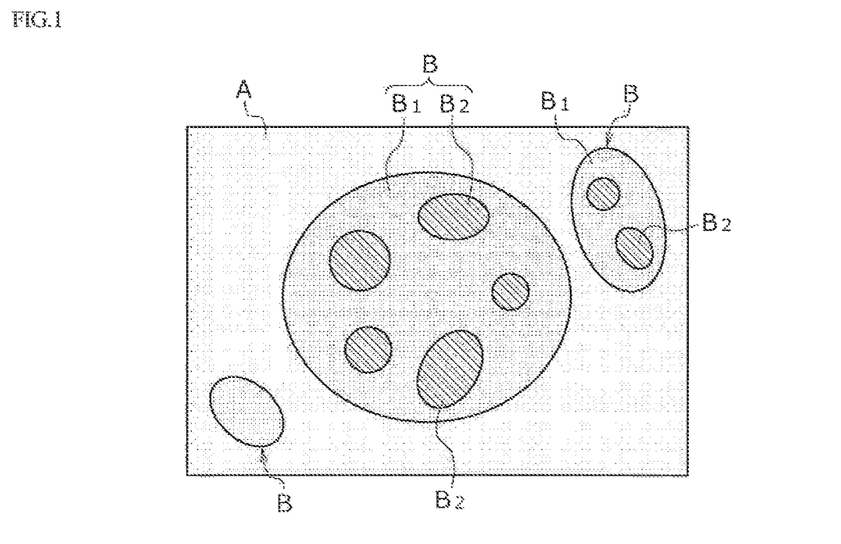
FIG. 1 is an illustration for explaining a phase structure (1) of a thermoplastic resin composition constituting a thermoplastic resin sheet according to the present invention.

In the phase structure (1), the dispersed phase (B) in the phase structure (1) may further have a continuous phase ($B_1$) that is present in the dispersed phase (B) and contains the polyamide resin and a fine dispersed phase ($B_2$) that is dispersed in the continuous phase ($B_1$) and contains the modified elastomer (see FIG. 1). In this case, the phase structure (1) has a multiple phase structure basing a fine dispersed phase ($B_1$) further dispersed in the dispersed phase (B).

It is to be noted that the modified elastomer present in the phase structure (1) may be an unreacted modified elastomer, a product obtained by reaction with the polyamide resin, or a mixture of them.

The phase structure (3) can be a co-continuous phase structure in which two continuous phases, the continuous phase ($A_1$) and the continuous phase ($A_2$), coexist. The dispersed phase ($B_{A1}$) present in the continuous phase ($A_1$) may have a continuous phase ($B_{A11}$) that is present in the dispersed phase ($B_{A1}$) and contains the polyamide resin and a fine dispersed phase ($B_{A12}$) that is dispersed in the continuous phase ($B_{A11}$) and contains the modified elastomer. In this case, the phase structure (3) is a multiple phase structure having a fine dispersed phase ($B_{A12}$) further dispersed in the dispersed phase ($B_{A1}$).

It is to be noted that the modified elastomer present in the phase structure (3) may be an unreacted modified elastomer, a product obtained by reaction with the polyamide resin, or a mixture of them.

In the case of the phase structure (1), the continuous phase (A) contains a polyolefin resin. The polyolefin resin is a main component of the continuous phase (A) (the ratio of the polyolefin resin is usually 70% by mass or more and may be 100% by mass with respect to the total mass of the continuous phase A). Further, the dispersed phase (B) contains a polyamide resin and a modified elastomer. The polyamide resin (when the dispersed phase (B) contains a modified elastomer, the polyamide resin and the modified elastomer) is (are) a main component of the dispersed phase (B) (the ratio of the polyamide resin (the polyamide resin and the modified elastomer is usually 70% by mass or more or may be 100% by mass with respect to the total mass of the dispersed phase B).

When the phase structure (1) is the above-described multiple phase structure, the continuous phase ($B_1$) contains the polyamide resin. The polyamide resin is a main component of the continuous phase ($B_1$) (the ratio of the polyamide resin is usually 70% by mass or more and may be 100% by mass with respect to the total mass of the continuous phase $B_1$). The fine dispersed phase (B)) contains the modified elastomer. The modified elastomer is a main component of the fine dispersed phase ($B_2$) (the ratio of the modified elastomer is usually 70% by mass or more and may be 100% by mass with respect to the total mass of the fine dispersed phase $B_2$).

In the case of the phase structure (3), the continuous phase ($A_1$) contains a polyolefin resin. The polyolefin resin is a main component of the continuous phase ($A_1$) (the ratio of the polyolefin resin is usually 70% by mass or more and may be 100% by mass with respect to the total mass of the continuous phase $A_1$). Further, the dispersed phase ($B_{A1}$) contains a polyamide resin and a modified elastomer. The polyamide resin and the modified elastomer are a main component of the dispersed phase ($B_{A1}$) (the ratio of the polyamide resin and the modified elastomer is usually 70% by mass or more and may be 100% by mass with respect to the total mass of the dispersed phase $B_{A1}$).

When the phase structure (3) is the above-described multiple phase structure, the continuous phase ($B_{A11}$) contains the polyamide resin. The polyamide resin is a main component of the continuous phase ($B_{A11}$) (the ratio of the polyamide resin is usually 70% by mass or more and may be 100% by mass with respect to the total mass of the continuous phase $B_{A11}$). The fine dispersed phase ($B_{A12}$) contains the modified elastomer. The modified elastomer is a main component of the fine dispersed phase ($B_{A12}$) (the ratio of the modified elastomer is usually 70% by mass or more and may be 100% by mass with respect to the total mass of the fine dispersed phase $B_{A12}$).

The continuous phase ($A_2$) contains the polyamide resin. The polyamide resin is a main component of the continuous phase ($A_2$) (the ratio of the polyamide resin is usually 70% by mass or more and may be 100% by mass with respect to the total mass of the continuous phase $A_2$). The dispersed phase ($B_{A2}$) dispersed in the continuous phase ($A_2$) contains the modified elastomer. The modified elastomer is a main component of the dispersed phase ($B_{A2}$) (the ratio of the modified elastomer is usually 70% by mass or more and may be 100% by mass with respect to the total mass of the dispersed phase $B_{A2}$).

When having such a phase structure (1) or (3), the thermoplastic resin sheet according to the present invention can have a higher value of $S_{140}/S_{120}$ that will be described later. As will be described later, these phase structures can be more reliably obtained by melt-kneading a polyolefin resin and a melt-kneaded product of a polyamide resin and a modified elastomer.

It is to be noted that as described above, the thermoplastic resin sheet according to the present invention may contain a reaction product obtained by the reaction of the reactive group of the modified elastomer with the polyamide resin. In this case, in the phase structure (1), the reaction product can be present at, for example, the interface between the continuous Phase (A) and the dispersed phase (B) and/or the interface between the continuous phase ($B_1$) and the fine dispersed phase ($B_2$). Similarly, in the phase structure (3), the reaction product may be present at, for example, the interlace between the continuous phase ($A_1$) and the continuous phase ($A_2$), the interface between the continuous phase ($A_1$) and the dispersed phase ($B_{A1}$), and the interface between the continuous phase ($B_{A11}$) and the fine dispersed phase ($B_{A12}$).

The various phase structures can be observed by observing the treated surface of a test specimen (a test specimen of the thermoplastic resin sheet) subjected to oxygen plasma etching and then to osmium coating with a field-emission scanning electron microscope (FE-SEM). Particularly, the dispersed phase and the fine dispersed phase can be observed in an image enlarged 1000 times or more (usually 10,000 times or less) by such a method. The component constituting each of the phases can be identified by performing energy dispersive X ray spectrometry (EDS) during the observation using a field-emission scanning electron microscope (FE-SEM).

The size of the dispersed phase (the dispersed phase B shown in FIG. 1, the dispersed phase $B_{A1}$ shown in FIG. 2) of the thermoplastic resin sheet according to the present invention is not particularly limited, but the dispersion diameter (average dispersion diameter) of the dispersed phase is preferably 10000 nm or less, more preferably 50 nm or more but 8000 nm or less, even more preferably 100 nm or more but 4000 nm or less.

The dispersion diameter of the dispersed phase can be measured in an electron microscope image enlarged 1000 times or more. More specifically, 20 particles of the dispersed phase are randomly selected in a predetermined area in the image, the lamest diameter of each of the particles is measured, and an average of the largest diameters is determined as a first average. Then, first averages measured in 5 different areas in the image are further averaged to determine an average dispersion diameter (major-axis average dispersion diameter) of the dispersed phase.

The size of the fine dispersed phase (the fine dispersed phase $B_2$ shown in FIG. 1, the fine dispersed phase $B_{A12}$ shown in FIG. 2) contained in the dispersed phase (the dispersed phase B shown in FIG. 1, the dispersed phase $B_{A1}$ shown in FIG. 2) of the thermoplastic resin sheet according to the present invention is not particularly limited, but the dispersion diameter (average dispersion diameter) of the line dispersed phase is preferably 5 nm or more but 1000 nm or less, more preferably 5 nm or more but 600 nm or less, even more preferably 10 nm or more but 400 nm or less, particularly preferably 15 nm or more but 350 nm or less.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the fine dispersed phase.

(6) Blending

When the total of the polyolefin resin, the polyamide resin, and the modified elastomer contained in the thermoplastic resin sheet according to the present invention is taken as 100% by mass, the ratio of the polyolefin resin may be 2% by mass or more but 90% by mass or less. The ratio of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less. When the ratio of the polyolefin resin is within the above range, it is possible to obtain a thermoplastic resin sheet having a higher value of $S_{140}/S_{120}$.

When the total of the polyolefin resin, the polyamide resin, and the modified elastomer contained in the thermoplastic resin sheet according to the present invention is taken as 100% by mass, the ratio of the polyamide resin and the modified elastomer (part or all of them may be reacted with each other) may be 10% by mass or more but 98% by mass or less. The ratio of the polyamide resin and the modified elastomer is preferably 15% by mass or more but 95% by mass or less, more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less. When the ratio of the polyolefin resin is within the above range, it is possible to obtain a thermoplastic resin sheet having a higher value of $S_{140}/S_{120}$.

When the total of the polyolefin resin, the polyamide resin, and the modified elastomer contained in the thermoplastic resin sheet according to the present invention is taken as 100% by mass, the ratio of the polyamide resin may be 1% by mass or more but 75% by mass or less. The ratio of the polyamide resin is preferably 2% by mass or more but 70% by mass or less, mere preferably 4% by mass or more but 65% by mass or less, even more preferably 6% by mass or more but 60% by mass or less, even more preferably 8% by mass or more but 55% by mass or less, even more preferably 10% by mass or more but 50% by mass or less, even more preferably 12% by mass or mole but 45% by mass or less, even more preferably 15% by mass or more but 40% by mass or less. When the ratio of the polyolefin resin is within the above range, it is possible to obtain a thermoplastic resin sheet having a higher value of $S_{140}/S_{120}$.

When the total of the polyolefin resin, the polyamide resin, and the modified elastomer contained in the thermoplastic resin sheet according to the present invention is taken as 100% by mass, the ratio of the modified elastomer may be 1% by mass or more but 60% by mass or less. The ratio of the modified elastomer is preferably 2% by mass or more but 55% by mass or less, more preferably 4% by mass or more but 45% by mass or less, even more preferably 6% by mass or more but 40% by mass or less, even more preferably 8% by mass or more but 38% by mass or less, even more preferably 10% by mass or more but 37% by mass or less, even more preferably 12% by mass or more but 36% by mass or less, even more preferably 15% by mass or more but 35% by mass or less. When the ratio of the polyolefin resin is within the above range, it is possible to obtain a thermoplastic resin sheet having a higher value of $S_{140}/S_{120}$.

When the total of the polyolefin resin and the polyamide resin contained in the thermoplastic resin sheet according to the present invention is taken as 100% by mass, the ratio of the polyamide resin may be 1.5% by mass or mole but 88% by mass or less. The ratio of the polyamide resin is preferably 3% by mass or more but 75% by mass or less, more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less. When the ratio of the polyolefin resin is within the above range, it is possible to obtain a thermoplastic resin sheet having a higher value of $S_{140}/S_{120}$.

When the total of the polyamide resin and the modified elastomer contained in the thermoplastic resin sheet according to the present invention is taken as 100% by mass, the ratio of the modified elastomer may be 20% by mass or more but 90% by mass or less. The ratio of the modified elastomer is preferably 22% by mass or more but 88% by mass or less, more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less. When the ratio of the polyolefin resin is within the above range, it is possible to obtain a thermoplastic resin sheet having a higher value of $S_{140}/S_{120}$.

It is to be noted that in the case of the phase structure (1) (see FIG. 1), the ratio of the polyolefin resin when the total of the polyolefin resin, the polyamide resin, and the modified elastomer is taken as 100% by mass is usually equal to the ratio of the continuous phase (A) when the total mass of the phases of the phase structure (1) is taken as 100%. On the other hand, in the case of the phase structure (3) (see FIG. 2), the ratio of the polyolefin resin when the total of the polyolefin resin, the polyamide resin and the modified elastomer is taken as 100% by mass is usually equal to the ratio of the continuous phase ($A_1$) when the total mass of the phases of the phase structure (3) is taken as 100%. The ratio mentioned herein refers to a volume ratio, and is usually also equal to an area ratio reflecting the volume ratio (the same applies hereinafter).

In the case of the phase structure (1) (see FIG. 1), the ratio of the polyamide resin and the modified elastomer when the total of the polyolefin resin, the polyamide resin, and the modified elastomer is taken as 100% by mass is usually equal to the ratio of the dispersed phase (B) when the total mass of the phases of the phase structure (1) is taken as 100%. On the other hand, in the case of the phase structure (3) (see FIG. 2), the ratio of the polyamide resin and the modified elastomer when the total of the polyolefin resin, the polyamide resin, and the modified elastomer is taken as 100% by mass is usually equal to the total ratio of the dispersed phase ($B_{A1}$), the continuous phase ($A_2$), and the dispersed phase ($B_{A2}$) when the total mass of the phases of the phase structure (3) is taken as 100%.

In the case of the phase structure (1) (see FIG. 1), the ratio of the polyamide resin when the total of the polyolefin resin, the polyamide resin, and the modified elastomer is taken as 100% by mass is usually equal to the ratio of the continuous phase ($B_1$) when the total mass of the phases of the phase structure (1) is taken as 100%. On the other hand, in the case of the phase structure (3) (see FIG. 2), the ratio of the polyamide resin when the total of the polyolefin resin, the polyamide resin, and the modified elastomer is taken as 100% by mass is usually equal to the total ratio of the continuous phase ($A_2$) and the continuous phase ($B_{A11}$) present in the dispersed phase when the total mass of the phases of the phase structure (3) is taken as 100%.

In the case of the phase structure (1) (see FIG. 1), the ratio of the modified elastomer when the total of the polyolefin resin, the polyamide resin, and the modified elastomer is taken as 100% by mass is usually equal to the ratio of the fine dispersed phase ($B_2$) when the total mass of the phases of the phase structure (1) is taken as 100%. On the other hand, in the case of the phase structure (3) (see FIG. 2), the ratio of the modified elastomer when the total of the polyolefin resin, the polyamide resin, and the modified elastomer is taken as 100% by mass is usually equal to the total ratio of the fine dispersed phase ($B_{A12}$) and the dispersed phase ($B_{A2}$) when the total mass of the phases of the phase structure (3) is taken as 100%.

(6) Physical Properties

When elongation at break at a temperature of 140° C. is defined as $S_{140}$(%) and elongation at break at a temperature of 120° C. is defined as $S_{120}$(%), the thermoplastic resin sheet according to the present invention can have $S_{140}$ that is 1.2 or more times $S_{120}$. That is, the thermoplastic resin sheet according to the present invention can satisfy $S_{140}/S_{120} \geq 1.2$. The value of "$S_{140}/S_{120}$" is usually 3.5 or less. The value of "$S_{140}/S_{120}$" may exceed 3.5, but if the value of "$S_{140}/S_{120}$" is excessively high, there is a case where it is difficult to control the percentage of elongation in a temperature range suitable for processing. Therefore, the value of "$S_{140}/S_{120}$" preferably satisfies $1.2 \leq S_{140}/S_{120} \leq 3.5$. Further, the ratio more preferably satisfies $1.3 \leq S_{140}/S_{120} \leq 3.0$, even more preferably satisfies $1.4 \leq S_{140}/S_{120} \leq 2.5$, and particularly preferably satisfies $1.5 \leq S_{140}/S_{120} \leq 2.0$.

It is to be noted that the elongation at break (%) is measured and calculated by the following method. A strip test specimen having a size of 6 mm×35 mm of a thermoplastic resin sheet having a mass per unit area of 300 g/m² is prepared. Then, the test specimen is set in a tensile tester having a distance between chucks of 20 mm (initial value $T_0$) and maintained at a measurement target temperature for 2 minutes, and then a tensile test is performed at the same temperature until the test specimen breaks. Then, the distance between chucks at a breaking point is defined as T (mm), and "T (mm)/20 (mm)×100" is calculated to determine the value of "elongation at break (%)".

Currently, polyolefin resins are widely used for industrial products. When polyolefin resins are molded by a conventional injection method, their high flowability is useful and advantageous. However, when subjected to pressure molding (e.g., cold pressing after heating), polyolefin resins tend to be too soft at a molding temperature, and are therefore sometimes difficult to process. That is, similarly to other resins, polyolefin resins also have a temperature range in which their softness sharply increases due to heating, and therefore it is often difficult to maintain their hardness suitable for pressure molding in a temperature range suitable for processing.

In this regard, the hardness of a polyolefin resin during heating can be increased by increasing the degree of polymerization of the polyolefin resin or mixing the polyolefin resin having a low degree of polymerization with a polyolefin resin having a high degree of polymerization. However, the degree of polymerization influences product performance. Therefore, in many cases, the polymerization degree of a polyolefin cannot be selected on the basis of easiness of molding. In order to solve such a problem, an assistant sheet is used to assist a polyolefin in a heated state when the polyolefin is heated for pressure molding. As such an assistant sheet, for example, a laminated film is conventionally used in which two polyolefin film layers and a nylon film interposed therebetween are integrated together. However, the nylon film is not sufficiently softened at the processing temperature of the polyolefin. Therefore, when the polyolefin is subjected to drawing (e.g., deep drawing for allowing a plate-shaped material to have a concave-convex shape, see FIG. 4 and FIG. 5), insufficient elongation of the assistant sheet may cause a problem. That is, it is difficult for such a conventionally-known assistant sheet to achieve appropriate elongation at the processing temperature of the polyolefin. Further, a polyolefin and nylon are materials that are hard to bond together. Therefore, it takes cost to integrate the three layers together in addition to the cost of three raw material films, which causes a problem that the cost of the assistant sheet itself increases.

Figure 4:
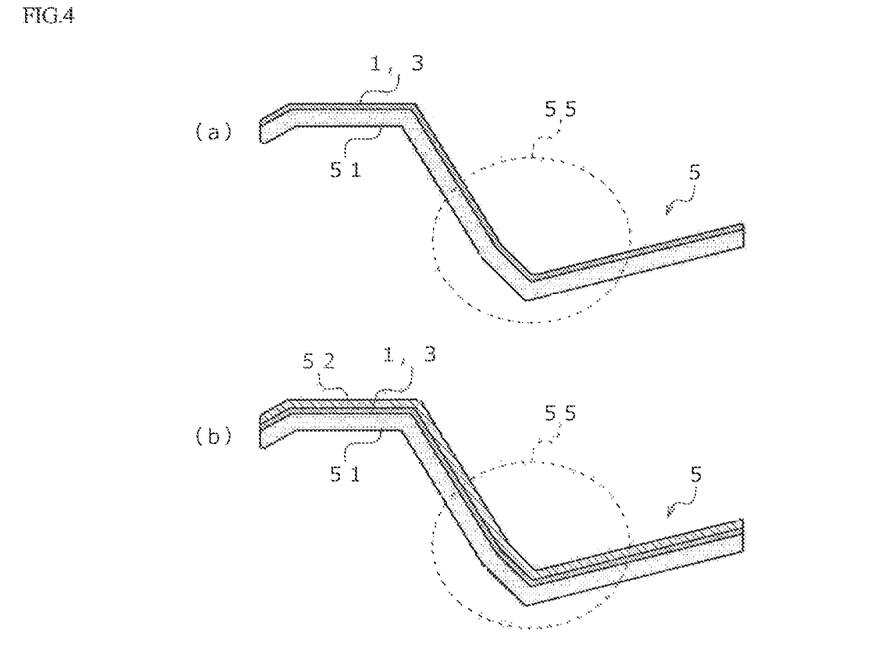
FIG. 4 is an illustration for explaining a molded body according to the present invention.
Figure 5:
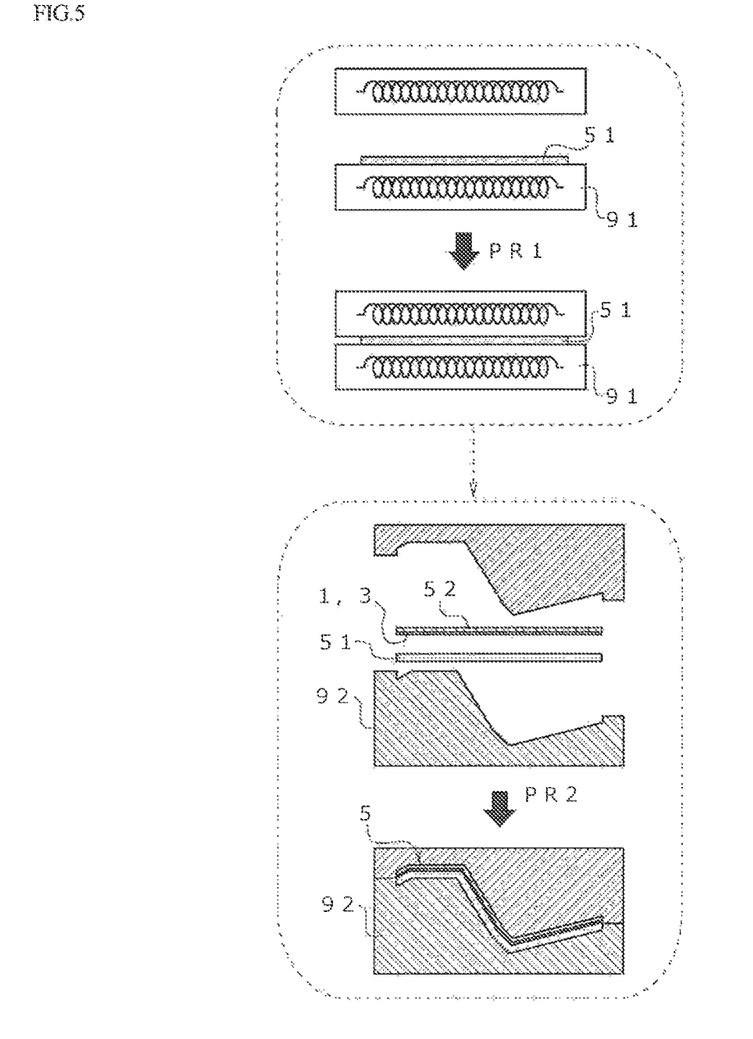
FIG. 5 is an illustration for explaining a method for producing a molded body according to the present invention.

From such a viewpoint, the thermoplastic resin sheet according to the present invention can exhibit appropriate properties. More specifically, the thermoplastic resin sheet according to the present invention satisfies $S_{140}/S_{120} \geq 1.2$ as described above and can maintain hardness higher than that of a polyolefin resin, and its elongation percentage in a processing temperature range optimum for a polyolefin resin greatly changes. Therefore, the thermoplastic resin sheet according to the present invention can be suitably used as such an assistant sheet as described above when pressure molding is performed to obtain a molded body containing a polyolefin resin. In addition, the thermoplastic resin sheet according to the present invention contains a polyolefin resin as its component, and therefore has an excellent affinity for a polyolefin resin. Therefore, when a polyolefin resin is molded using the thermoplastic resin sheet according to the present invention as an assistant sheet, the thermoplastic resin sheet according to the present invention integrated with the polyolefin resin is allowed to remain on the surface of the polyolefin resin (see FIG. 4). That is, after used as an assistant sheet, the thermoplastic resin sheet according to the present invention can remain on the surface of a molded body containing a polyolefin resin due to thermal fusion to become part of the molded body (FIG. 4). The thermoplastic resin constituting the thermoplastic resin sheet according to the present invention can exhibit very excellent impact resistance (as described in Patent Literatures 1 to 4). Therefore, when being allowed to remain on the surface of a molded body containing a polyolefin resin, the thermoplastic resin sheet according to the present invention can impart excellent impact resistance to the molded body. That is, the thermoplastic resin sheet according to the present invention can impart high impact resistance and cracking resistance to the molded body.

(7) Form

The thickness of the thermoplastic resin sheet according to the present invention is not particularly limited, and can be appropriately set depending on the purpose of use. The thermoplastic resin sheet according to the present invention can also be called a thermoplastic resin film. More specifically, the thermoplastic resin sheet according to the present invention can have a thickness of, for example, 0.01 μm or more but 5000 μm or less. When the thermoplastic resin sheet according to the present invention is used singly (e.g., when the thermoplastic resin sheet according to the present invention itself is shaped to be used as a base material or when the thermoplastic resin sheet according to the present invention is used as a translucent film), its thickness is preferably 50 μm or more but 4800 μm or less, more preferably 100 μm or more but 4500 μm or less, particularly preferably 500 μm or more but 4200 μm or less. On the other hand, when the thermoplastic resin sheet according to the present invention is used for the purpose of assisting the shaping of a molded body, its thickness is preferably 0.1 μm or more but 2500 μm or less, more preferably 1 μm or more but 1000 μm or less, particularly preferably 10 μm or more but 500 μm or less.

The mass per unit area of the thermoplastic resin sheet according to the present invention is not particularly limited, and can be appropriately set depending on the purpose of use. For example, the thermoplastic resin sheet according to the present invention can have a mass per unit area of 1 g/m² or more but 1000 g/m² or less. Particularly, when the thermoplastic resin sheet according to the present invention is used for the purpose of assisting the shaping of a molded body, its mass per unit area is preferably 25 g/m² or more but 800 g/m² or less.

(8) Production of Thermoplastic Resin Sheet

A method for producing the thermoplastic resin sheet according to the present invention is not limited, and the thermoplastic resin sheet according to the present invention can be produced by a conventionally known method. For example, a sheet molding method can be used, such as an extrusion method, a coating method, a casting method, a pressing method, an injection molding method, or an inflation method. The thermoplastic resin sheet according to the present invention may be stretched or unstretched.

A method for producing a thermoplastic resin composition constituting the thermoplastic resin sheet according to the present invention is not limited, either. The thermoplastic resin composition can be more reliably obtained by, for example, melt-kneading a melt-kneaded product of a polyamide resin and a modified elastomer, and a polyolefin resin. The preparation of the melt-kneaded product and the melt-kneading of the melt-kneaded product and a polyolefin resin may be performed using any melt-kneading device. Examples of the melt-kneading device include an extruder (e.g., a single-screw extruder or a twin-screw melt-kneading extruder), a kneader, and a mixer (e.g., a high-speed flow mixer, a paddle mixer, or a ribbon mixer).

It is to be noted that the melt-kneading temperature of a polyamide resin and a modified elastomer is not limited, and may be, for example, 190° C. or higher but 350° C. or lower, but is preferably 200° C. or higher but 330° C. or lower, more preferably 205° C. or higher but 310° C. or lower. The melt-kneading temperature of the obtained melt-kneaded product and a polyolefin resin is not limited, and may be, for example, 190° C. or higher but 350° C. or lower, but is preferably 200° C. or higher but 300° C. or lower, more preferably 205° C. or higher but 260° C. or lower.

[2] Laminated Sheet

Figure 3:
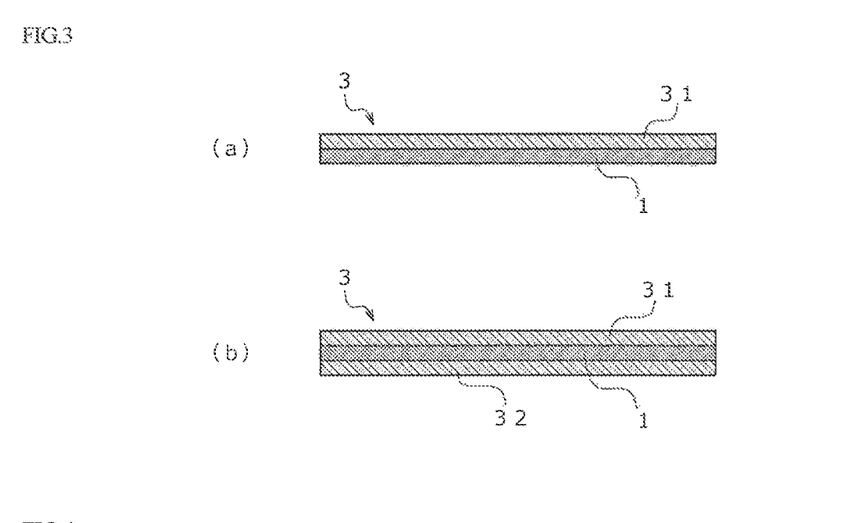
FIG. 3 is an illustration for explaining a laminated sheet according to the present invention.

A laminated sheet (3) according to the present invention includes: a base layer (31) containing a polyolefin resin; and the thermoplastic resin sheet (1) according to the present invention bonded to one surface of the base layer (31) (see FIG. 3).

The base layer 31 and the thermoplastic resin sheet 1 according to the present invention are usually bonded together. A method for bonding them together is not limited, and the base layer 31 and the thermoplastic resin sheet 1 according to the present invention may be bonded together with an adhesive or by thermal fusion.

The base layer 31 containing a polyolefin resin contains a polyolefin resin as its constituent material. The amount of a polyolefin resin contained in the base layer 31 is not limited, but is usually 50% by mass or more when the total mass of the base layer 31 is taken as 100%. It is to be noted that the polyolefin resin may be contained in the base layer 31 uniformly or non-uniformly. The base layer 31 may be constituted from only a polyolefin resin. That is, when the total mass of the base layer 31 is taken as 100%, the amount of a polyolefin resin contained in the base layer 31 may be 100% by mass. The description about the polyolefin resin constituting the thermoplastic resin sheet 1 can be directly applied to the polyolefin resin contained in the base layer 31.

The polyolefin resin constituting base layer 31 and the polyolefin resin constituting the thermoplastic resin sheet 1 may be different from each other, but are preferably the same. When the polyolefin resin constituting the base layer 31 and the polyolefin resin constituting the thermoplastic resin sheet 1 are the same, a higher affinity can be achieved. This is preferred because the base layer 31 and the thermoplastic resin sheet 1 according to the present invention can be bonded together without using an adhesive. The case where the polyolefin resin constituting the base layer 31 and the polyolefin resin constituting the thermoplastic resin sheet 1 are the same includes, for example, a case where 50% or more (preferably 70% or more, more preferably 90% or more) of all the structural units of a polymer forming the polyolefin resin are the same. Naturally, when the polyolefin resin constituting the base layer 31 contains structural units different from those contained in the polyolefin resin constituting the thermoplastic resin sheet 1 according to the present invention, the upper limit of ratio of the same structural units is lower than 100%, and when the polyolefin resin constituting the base layer 31 and the polyolefin resin constituting the thermoplastic resin sheet 1 according to the present invention do not contain different structural units, the ratio of the same structural units is 100%.

The laminated sheet 3 may include only the base layer 31 and the thermoplastic resin sheet 1, but may further include another layer 32. For example, as illustrated in FIG. 3(b), the laminated sheet 3 according to the present invention can have a structure in which the thermoplastic resin sheet 1 is sandwiched between the base layer 31 and the other layer 32. The other layer 32 may be one containing a polyolefin resin that is the same as that contained in the base layer 31.

A specific example of the laminated sheet 3 according to the present invention includes one in which the base layer 31 is a polypropylene sheet, and the thermoplastic resin sheet 1 according to the present invention contains polypropylene as a polyolefin resin (see FIG. 3(a) and FIG. 3(b)).

Another specific example of the laminated sheet 3 according to the present invention includes one in which the base layer 31 is a polypropylene sheet, the thermoplastic resin sheet 1 according to the present invention contains polypropylene as a polyolefin resin, and the other layer 32 is a layer made of a polyamide resin (see FIG. 3(b)).

The thickness of the base layer 31 is not particularly limited, and may be appropriately set depending on the purpose of use, but is preferably in the range of, for example, 1 μm or more but 5000 μm or less. Particularly, when the laminated sheet according to the present invention is used for the purpose of assisting the shaping of a molded body; the thickness of the base layer 31 is preferably 10 μm or more but 1000 μm or less, more preferably 50 μm or more but 500 μm or less.

The mass per unit area of the base layer 31 is not particularly limited, and can be appropriately set depending on the purpose of use. For example, the base layer 31 can have a mass per unit area of 1 g/m² or more but 1000 g/m² or less. Particularly, when the thermoplastic resin sheet according to the present invention is used for the purpose of assisting the shaping of a molded body, its mass per unit area is preferably 25 g/m² or more but 800 g/m² or less.

As described above, the laminated sheet 3 according to the present invention contains the thermoplastic resin sheet 1 according to the present invention, and therefore can be appropriately used as an assistant sheet for shaping when a molded body containing a polyolefin resin is obtained by pressure molding. That is, the thermoplastic resin sheet 1 according to the present invention has a property represented by the formula $S_{140}/S_{120} \geq 1.2$, and therefore can maintain the property of being harder than the base layer 31 and easily elongating at the same temperature in the laminated sheet 3.

Further, the laminated sheet used as an assistant sheet when a molded body made of a polyolefin resin or a molded body containing a polyolefin resin is obtained by molding can be integrated with the molded body without being removed so as to remain on the surface of the molded body (see FIG. 4). That is, after used as an assistant sheet, the laminated sheet 3 according to the present invention can remain on the surface of a base body 51 due to thermal fusion to become part of a molded body 5 (FIG. 4). The thus obtained molded body 5 can exhibit very excellent impact resistance.

[3] Molded Body

A molded body (5) according to the present invention includes: a base body (51) containing a polyolefin resin; and the thermoplastic resin sheet (1) according to the present invention or the laminated sheet (3) according to the present invention bonded to one surface of the base body (51) (see FIG. 4).

(1) Structure of Molded Body

The thermoplastic resin sheet 1 according to the present invention and the laminated sheet 3 according to the present invention are as described above. Examples of the base body 51 include a molded body made of only a polyolefin resin and a fiber-reinforced molded body containing a polyolefin resin as a binder. The fiber-reinforced molded body includes reinforcing fibers and a binder binding the reinforcing fibers together. That is, the fiber-reinforced molded body is a molded body using a polyolefin resin as such a binder.

The form of the base body 51 is not limited, but the base body 51 may have, for example, a plate shape having an almost uniform thickness as a whole. If necessary, the base body 51 may have a concavo-convex shape of the molded body. Particularly, the molded body 5 is preferred when, as shown in FIG. 4(a) and FIG. 4(b), the base body 51 has a deep drawing portion 55 shaped by deep drawing. When such a deep drawing portion 55 is formed, shaping can be appropriately performed by using the thermoplastic resin sheet 1 according to the present invention or the laminated sheet 3 according to the present invention as an assistant sheet. For example, it is possible to prevent insufficient deep drawing of the base body 51 or an excess reduction in thickness. In addition, when the thermoplastic resin sheet according to the present invention or the laminated sheet according to the present invention is allowed to remain on the surface of the molded body 5 as described above, the molded body using the base body 51 obtained by binding reinforcing fibers with a resin binder is hard to break or never breaks.

Such a base body 51 can be obtained by, for example, thermally compressing a fiber mixture (mixture of fibers) of reinforcing fibers and fibers made of a polyolefin resin (resin fibers). More specifically, the base body 51 can be obtained by, for example, thermally compressing a fiber mixture of reinforcing fibers and polyolefin resin fibers to obtain a fiber-reinforced board, performing necessary processing on the fiber-reinforced board, thermally softening the polyolefin resin (resin fibers) again (see PR1 in FIG. 5), and, if necessary, shaping the fiber-reinforced board into a concavo-convex shape (see PR2 in FIG. 5).

The type of the reinforcing fibers is not limited, and inorganic fibers (e.g., glass fibers) or organic fibers (natural fibers such as plant fibers or animal fibers) can be used. These fibers may be used singly or in combination of two or more of them. Among them, organic fibers are preferred, natural fibers are more preferred, and plant fibers are particularly preferred. Plant fibers are derived from plants, and include fibers extracted from plants and fibers obtained by processing them. Examples of the plant fibers include veinbased plant fibers, bast-based plant fibers, wood-based plant fibers, and other plant fibers. These olefins may be used singly or in combination of two or more of them. Specific examples of the plant fibers include abaca, sisal, agave, flax, jute, hemp, kenaf, ramie, coconut shell fiber, oil palm empty fruit bunch fiber, rice straw fiber, wheat straw fiber, bamboo fiber, and cotton The fiber length of the reinforcing fibers is not limited, but may be 10 to 200 mm (further 20 to 170 mm, particularly 30 to 150 mm) on average. The average fiber length is determined as follows in accordance with JIS L1015. Single fibers are randomly sampled one by one by a direct method and are spread straight without being stretched, the fiber length of each of the single fibers, is measured with a scale, and the fiber lengths of a total of 200 single fibers are averaged.

The polyolefin resin that binds the reinforcing fibers together may be one that has been described above with reference to the thermoplastic resin sheet according to the present invention and the laminated sheet according to the present invention. Further, the polyolefin resin as a binder may further contain a modified polyolefin resin (except for a modified elastomer) modified by introduction of a polar group. Examples of the polar group include an anhydrous carboxylic acid group (—CO—O—OC—), a carboxylic acid group (—COOH), a carbonyl group (—CO—), a hydroxyl group (—OH), an amino group (—NH$_2$), a nitro group (—NO$_2$), and a nitrite group (—CN). These olefins may be used singly or in combination of two or more of them.

The molded body 5 may have a surface skin 52 (see FIG. 4(b)). The surface skin 52 is, for example, a layer laminated on the one surface side of the base body 51, and the outer surface of the surface skin 52 serves as a design surface of the molded body 5. That is, the surface skin 52 usually constitutes the design surface of the molded body 5. When the molded body 5 has a concavo-convex shape, the surface skin 52 is laminated on (and further bonded to) the surface of the base body 51 so as to conform to the concavo-convex shape.

The structure of the surface skin layer 12 is not limited, and the surface skin layer 12 may have one layer or two or more layers. When having two or more layers, the surface skin 52 may be a laminated body including, for example, a surface layer (e.g., artificial leather or fabric) having a design surface and a cushion layer (provided on the non-design surface side of the surface skin 52).

(2) Production of Molded Body

A method for manufacturing the molded body 5 is not limited. For example, when the molded body 5 is produced using, as the base body 51, a base body made of reinforcing fibers and a polyolefin resin as a binder binding the reinforcing fibers together, a method can be used, which includes: a heating step (PR1) in which a fiber-reinforced board 51 obtained by compressing a mixture of reinforcing fibers and a polyolefin resin is heated to soften the polyolefin resin; and a shaping step (PR2) in which the fiber-reinforced board 51 whose polyolefin resin has been softened is shaped.

Further, when the molded body 5 has the surface skin 52, the surface skin 52 can be bonded on the one surface side of the fiber-reinforced board 51 in or after the shaping step (PR2).

The heating step (PR1) is a step in which a fiber-reinforced board 51 is heated to soften a polyolefin resin contained in the fiber-reinforced board 51. The fiber-reinforced board 51 used in this step is a precursor that serves as the base body 51 in the molded body 5. The fiber-reinforced board 51 is a plate-shaped body obtained by compressing a mixture of reinforcing fibers and a polyolefin resin, and usually has a flat plate shape. The thickness of the fiber-reinforced board 51 (thickness before the heating step) may be, for example, 1 mm or more but 10 mm or less.

In the heating step PR1, the fiber-reinforced board 51 may be heated by any method, but is preferably heated under pressure so that compression is not excessively released by heating. From such a viewpoint, a hot press machine 91 (see FIG. 5) is preferably used. Conditions for heating are not limited, but the fiber-reinforced board 51 is preferably heated to, for example, 70° C. or higher (which is the internal temperature of the fiber-reinforced board 51). The heating temperature is more preferably 80° C. or higher but 150° C. or lower, even more preferably 85° C. or higher but 130° C. or lower, particularly preferably 90° C. or higher but 120° C. or lower The shaping step (PR2) is a step in which the fiber-reinforced board 51 whose polyolefin resin has been softened is shaped. This step can be performed using a cold press machine 92 (see FIG. 5). Molding conditions for cold press molding are not particularly limited. For example, the temperature of a mold during molding may be 20° C. or higher but 60° C. or lower. Further; the clamping time may be 30 seconds or longer but 60 seconds or shorter: When the surface skin 52 is used, the surface skin 52 is laminated on the thermoplastic resin sheet 1 according to the present invention or the laminated sheet 3 according to the present invention, and the thus obtained laminated body and a base body 51 are pressed together so that the fiber-reinforced board 51 is shaped and, at the same time, a molded body 5 according to the present invention can be obtained in which the surface skin 52 and the thermoplastic resin sheet 1 according to the present invent or the laminated sheet 3 according to the present invention are bonded to one surface of the fiber-reinforced board 55 (see FIG. 5).

The applications of the thermoplastic resin sheet according to the present invention and the laminated sheet according to the present invention are not particularly limited. For example, the thermoplastic resin sheet according to the present invention and the laminated sheet according to the present invention can be used as sheets constituting exterior materials, interior materials, structural materials, and shock absorbing auxiliary materials for automobiles, railway vehicles, boats and ships, and airplanes. The shape, size, thickness, and the like of the molded body 5 according to the present invention are not particularly limited, and the application of the molded body 5 according to the present invention is not particularly limited, either. For example, the molded body 5 can be used as an exterior material, an interior material, a structural material, and an impact absorbing auxiliary material the automobiles, railway vehicles, boats and ships, and airplanes. Examples of the automotive materials include automotive exterior materials, automotive interior materials, automotive structural materials, automotive impact absorbers, and engine room parts. Specific examples of the automotive materials include bumpers, spoilers, cowlings, front grilles, garnishes, hoods, trunk lids, cowl louvers, fender panels, rocker moldings, door panels, roof panels, instrument panels, center clusters, door trims, quarter trims, roof linings, pillar garnishes, deck trims, tonneau boards, package trays, dashboards, console boxes, kicking plates, switch bases, seat backboards, seat frames, armrests, sun visors, intake manifolds, energy absorbers such as engine head covers, engine under covers, oil filter housings, housings for car electronic parts (e.g., ECUs and TV monitors), air filter boxes, and rush boxes, and body shell constituent parts such as front end modules.

The thermoplastic resin sheet 1 according to the present invention and the laminated sheet 3 according to the present invention can be used as, for example, sheets constituting interior materials, exterior materials, and structural materials for buildings and furniture. The shape, size, thickness, and the like of the molded body 5 according to the present invention are not particularly limited, and the application of the molded body 5 according to the present invention is not particularly limited, either. The molded body 5 according to the present invention can be used as, for example, an interior material, an exterior material, and a structural material for buildings and furniture. Specific examples thereof include door covering materials, door structural materials, and covering materials and structural materials for furniture (e.g., desks, chairs, shelves, chests of drawers). The molded body 5 according to the present invention can also be used as, for example, a package, a container (e.g., a tray), a protective member, and a partition member. Further, the molded body 5 according to the present invention can be used as a housing or a structural body for home appliances (e.g., flat TVs, refrigerators, washing machines, cleaners, mobile phones, portable game machines, notebook-size personal computers). The molded body 5 according to the present invention can also be appropriately used as an electronic/electric device, a medical device, a material for civil engineering and construction, a food-related material, and an office equipment part.

EXAMPLES

Hereinbelow, the present invention will be specifically described with reference to examples.
[1] Production of Thermoplastic Resin Sheet
(1) Thermoplastic Resin Sheet of Experimental Example 1

Pellets of the following polyamide resin and pellets of the following modified elastomer were dry-blended, then fed into a twin-screw melt-kneading extruder, and melt-kneaded at a kneading temperature of 210° C. The thus obtained melt-kneaded product of the polyamide resin and the modified elastomer was pelletized by a pelletizer to obtain pellets of the melt-kneaded product. Further, the pellets (pellets of the melt-breaded product of the polyamide resin and the modified elastomer) and pellets of the following polyolefin resin were dry-blended, then fed into a twin-screw melt-kneading extruder, and melt-kneaded at a kneading temperature of 210° C., and extruded through a T-die extruder to obtain a sheet made of a thermoplastic resin composition having a mass per unit area of 300 g/m² (Experimental Example 1).

It is to be noted that the polyolefin resin, the polyamide resin, and the modified elastomer were blended in a mass ratio of 55:25:20. The thermoplastic resin composition having such a mass ratio has a phase structure (1) (see FIG. 1).
  Polyolefin resin: polypropylene resin, homopolymer, manufactured by Japan Polypropylene Corporation, product name: "NOVATEC MA1B", weight-average molecular weight: 312,000, melting point 165° C.
  Polyamide resin: nylon 11 resin, manufactured by Arkema, product name: "Rilsan BMN O", weight-average molecular weight: 18,000, melting point: 190° C.
  Modified elastomer maleic anhydride-modified ethylene-butene copolymer (modified EBR), manufactured by Mitsui Chemicals, Inc., product name: "TAFMER MH7020"

(2) Thermoplastic Resin Sheet of Experimental Example 2

A sheet made of a thermoplastic resin composition having a mass per unit area of 300 g/m² (Experimental Example 2) was obtained in the same manner as in the above (1) except that the polyolefin resin, the polyamide resin, and the modified elastomer were blended in a mass ratio of 32.5:42.5:25. The thermoplastic resin composition having such a mass ratio has a phase structure (3) (see FIG. 2).
(3) Thermoplastic Resin Sheet of Experimental Example 3

The following polyolefin resin was formed into a sheet having a mass per unit area of 300 g/m² using a T-die extruder.
  Polyolefin resin: polypropylene resin, block polymer, manufactured by Prime Polymer Co., Ltd., product name: "J-452 HP", melting point: 165° C.
(4) Thermoplastic Resin Sheet of Experimental Example 4

The following polyamide resin was formed into a sheet having a mass per unit area of 300 g/m² using a T-die extruder.
  Polyamide resin: nylon 6 resin, manufactured by Toray Industries, Inc., product name: "Amilan CM1021FS", melting point: 225° C.
[2] Evaluation of Thermoplastic Resin Sheet Each of the thermoplastic resin sheets of Experimental Examples 1 to 4 obtained in the above [1] was cut into strips of 6 mm×35 mm to obtain test specimens for evaluation.

Figure 6:
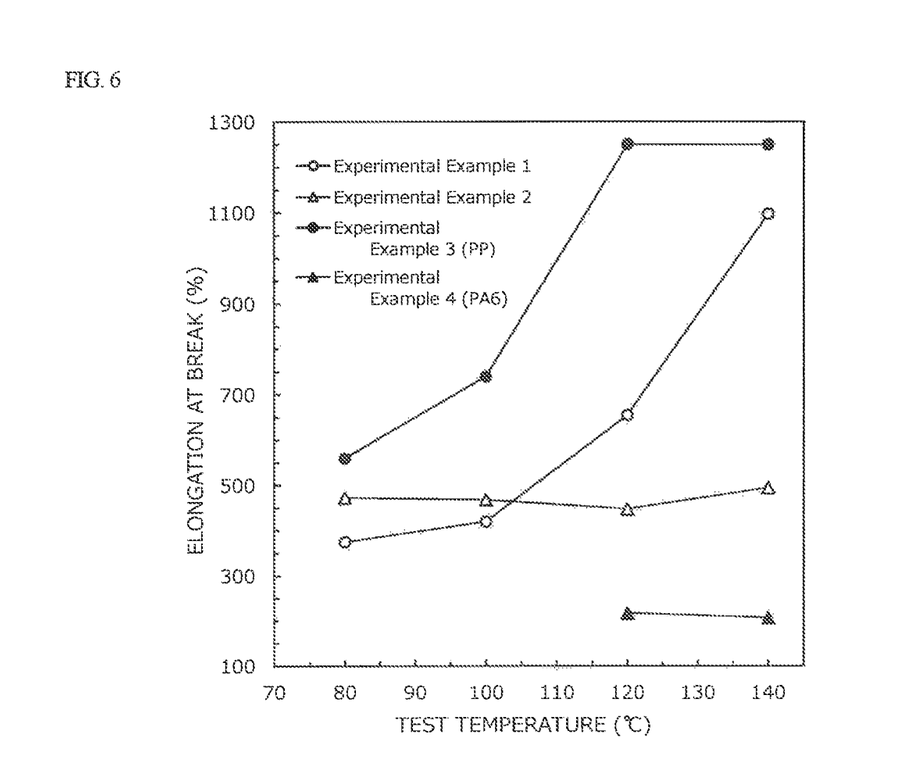
FIG. 6 is a graph showing a correlation between test temperature and elongation at break.

Then, the test specimen was set in a tensile tester (Instron type) having a distance between chucks of 20 mm value $T_0$) and maintained at a temperature of 80° C. for 2 minutes, and then a tensile test was performed at a temperature of 80° C. and a tension rate of 50 mm/min until the test specimen broke. Then, the distance between chucks at a breaking point was defined as T (mm), and "T (mm)/20 (mm)×100" was calculated to determine the value of "elongation at break (%)". The elongation at break of each of the test specimens was measured in the same manner at a temperature of 100° C., 120° C., or 140° C. The results are shown in Table 1, and a graph of the results (horizontal axis: test temperature/vertical axis: elongation at break) is shown in FIG. 6. It is to be noted that in Experimental Example 3, the elongation at break reached its upper measurement limit in measurement at 120° C. and 140° C. This suggests that $S_{140}/S_{120}$ of Experimental Example 3 actually exceeds 1.

TABLE 1

| | Test Temperature | Experimental Example 1 | Experimental Example 2 | Experimental Example 3 | Experimental Example 4 |
|---|---|---|---|---|---|
| Elongation at Break (%) | 80° C. | 375 | 473 | 560 | — |
| | 100° C. | 420 | 468 | 740 | — |
| | 120° C. | 655 | 448 | 1250 | 218 |
| | 140° C. | 1098 | 495 | 1250 | 208 |
| $S_{140}/S_{120}$ | | 1.68 | 1.1 | −1.0 | 0.95 |

[3] Effects of Examples

As can be seen from the results shown in FIG. 6, the elongation at break of Experimental Example 4 (PA6) hardly changes in the temperature range of 120 to 140° C. That is, when the thermoplastic resin sheet of Example 4 is shaped together with a polypropylene resin by pressure molding, the elongation of the sheet of Experimental Example 4 cannot be controlled in this temperature range. Further, as can be seen from FIG. 6, the elongation of the sheet of Experimental Example 4 is much smaller than that of polypropylene in the pressure molding temperature range of the polypropylene, and therefore it is difficult to perform deep drawing when both the polypropylene and the sheet are shaped at the same time. Further, as can be seen from FIG. 6, the elongation at break of the thermoplastic resin sheet of Experimental Example 2 is higher than that of the sheet of Experimental Example 4 over the whole temperature range. However, the elongation of the sheet of Experimental Example 2 remains much smaller than that of polypropylene in the pressure molding temperature range of the polypropylene, which indicates that it is difficult to perform deep drawing when both the polypropylene and the sheet of Experimental Example 2 are shaped at the same time.

On the other hand, as can be seen from FIG. 6, the elongation at break of the thermoplastic resin sheet of Experimental Example 1 significantly changes in the temperature range of 120 to 140° C. similarly to the polypropylene (Experimental Example 3). More specifically, the value of $S_{140}/S_{120}$ of the thermoplastic resin sheet of Experimental Example 1 is 1.68. However, the elongation at break of the sheet of Experimental Example 1 is smaller than that of the sheet of Experimental Example 3 over the whole temperature range. This indicates that the elongation of the sheet of Experimental Example 1 can easily be controlled in this temperature range. Further, the elongation of the sheet of Experimental Example 1 is moderately smaller than that of polypropylene in the pressure molding temperature range of the polypropylene, which indicates that deep drawing can be performed when both the sheet of Experimental Example 1 and the polypropylene are shaped at the same time.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein, rather the present invention extends to all the functionally-equivalent structures, methods, and uses within the scope of the appended claims.

REFERENCE SIGNS LIST

1: Thermoplastic resin sheet
3: Laminated sheet, 31: Base layer (polyolefin resin-containing base layer)
5: Molded body, 51: Base body (polyolefin resin-containing base body or precursor thereof), 52: Surface skin, 55: Deep drawing portion
91: Hot press machine, 92: Cold press machine
A: Continuous phase
B: Dispersed phase
$B_1$: Continuous phase (continuous phase in dispersed phase B)
$B_2$: Fine dispersed phase (dispersed phase in dispersed phase B)
$A_1$, $A_2$: Continuous phase
$B_{A1}$, $B_{A2}$: Dispersed phase
$B_{A11}$: Continuous phase (continuous phase in dispersed phase $B_{A1}$)
$B_{A12}$: Fine dispersed phase (dispersed phase in dispersed phase $B_{A1}$)
PR1: Heating step, PR2: Shaping step

The invention claimed is:

1. A thermoplastic resin sheet comprising a thermoplastic resin containing a polyolefin resin, a polyamide resin, and a compatibilizer, wherein
the compatibilizer is a modified elastomer having a reactive group that reacts with the polyamide resin,
the thermoplastic resin has a continuous phase (A) containing the polyolefin resin and a dispersed phase (B) dispersed in the continuous phase (A) and containing the polyamide resin and the modified elastomer, and
when its elongation at break at a temperature of 140° C. is defined as $S_{140}$(%) and its elongation at break at a temperature of 120° C. is defined as $S_{120}$(%), $S_{140}$ is 1.2 times or more $S_{120}$.

2. The thermoplastic resin sheet according to claim 1, wherein the dispersed phase (B) has a continuous phase ($B_1$) containing the polyamide resin and
a fine dispersed phase ($B_2$) dispersed in the continuous phase ($B_1$) and containing the modified elastomer.

3. The thermoplastic resin sheet according to claim 1, which is a melt-kneaded product of a melt-kneaded product of the polyamide resin and the modified elastomer and the polyolefin resin.

4. The thermoplastic resin sheet according to claim 1, wherein
the polyamide resin has a structure in which a hydrocarbon group between adjacent amide bonds in a main chain has a linear chain of 6 or more carbon atoms.

5. The thermoplastic resin sheet according to claim 1, wherein
the modified elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton.

6. A laminated sheet comprising: a base layer containing a polyolefin resin; and
the thermoplastic resin sheet according to claim 1 bonded to one surface of the base layer.

7. A molded body comprising: a base body containing a polyolefin resin; and
the thermoplastic resin sheet according to claim 1, the thermoplastic resin sheet being bonded to one surface of the base body.

8. The molded body according to claim 7, wherein the base body comprises reinforcing fibers and a binder binding the reinforcing fibers together, and
the binder is the polyolefin resin.

9. A molded body comprising: a base body containing a polyolefin resin; and
the laminated sheet according to claim 6, the laminated sheet being bonded to one surface of the base body.

* * * * *